(12) United States Patent
Harding et al.

(10) Patent No.: US 8,366,275 B2
(45) Date of Patent: Feb. 5, 2013

(54) IMAGE DISPLAY APPARATUS HAVING AT LEAST TWO MODULATORS FOR MODULATING LIGHT

(75) Inventors: John Robert Harding, Brighton (GB); Geoffrey Howard Blackham, Hassocks (GB); Phillip John Scarfield, Blackstone (GB)

(73) Assignee: Rockwell Collins UK Limited (GB)

( * ) Notice: Subject to any disclaimer, the term of this patent is extended or adjusted under 35 U.S.C. 154(b) by 278 days.

(21) Appl. No.: 12/734,037

(22) PCT Filed: Sep. 19, 2008

(86) PCT No.: PCT/GB2008/003176
§ 371 (c)(1),
(2), (4) Date: Apr. 6, 2010

(87) PCT Pub. No.: WO2009/048476
PCT Pub. Date: Apr. 16, 2009

(65) Prior Publication Data
US 2010/0253863 A1 Oct. 7, 2010

(30) Foreign Application Priority Data
Oct. 9, 2007 (GB) .................................. 0719721.3

(51) Int. Cl.
*G03B 21/26* (2006.01)
*G03B 21/28* (2006.01)
*G09G 3/34* (2006.01)
*G09G 5/10* (2006.01)
*G09G 5/02* (2006.01)
*G09G 5/39* (2006.01)
*H04N 7/12* (2006.01)
*G02F 1/135* (2006.01)
*G02F 1/29* (2006.01)

(52) U.S. Cl. ............... 353/30; 353/98; 345/84; 345/690; 345/531; 345/698; 345/214; 345/694; 348/428.1; 349/25; 359/318

(58) Field of Classification Search ............ 353/30, 353/98–99; 345/84, 690, 531, 698, 214, 345/694; 348/428.1; 349/25; 359/237, 318
See application file for complete search history.

(56) References Cited

U.S. PATENT DOCUMENTS
5,757,411 A * 5/1998 Florence .................... 347/245
6,985,272 B2 * 1/2006 Bridgwater et al. .......... 359/237

FOREIGN PATENT DOCUMENTS
EP 0 709 802 A 5/1996
WO WO 98/20475 A 5/1998

*Primary Examiner* — Georgia Y Epps
*Assistant Examiner* — Magda Cruz
(74) *Attorney, Agent, or Firm* — Iandiorio Teska & Coleman, LLP (57) ABSTRACT

Image display apparatus (102) comprising projector means (112), a light source (104), at least one primary modulator (106) for modulating light, an auxiliary modulator (110) for modulating the light modulated by the primary modulator (106), optical means (108) for relaying the light modulated by the primary modulator (106) to the auxiliary modulator (110), and control means (118, 120) for controlling the primary modulator (106) and the auxiliary modulator (110), characterized in that: the primary modulator (106) comprises a first array of pixels, and the auxiliary modulator (110) comprises a second array of pixels; each pixel in the first array of pixels of the primary modulator (106) is controlled by the control means (118, 120) as a function of video input data for each pixel in the first array of pixels; and each pixel in the second array of pixels of the auxiliary modulator (110) is controlled by control means (118, 120) as a function of video input data for each equivalent pixel in the second array of pixels, and each adjacent pixel in the second array of pixels.

10 Claims, 11 Drawing Sheets

IMAGE DISPLAY APPARATUS HAVING AT LEAST TWO MODULATORS FOR MODULATING LIGHT

This invention relates to image display apparatus and, more especially, this invention relates to image display apparatus having at least two modulators for modulating light.

Image display apparatus with at least two modulators for modulating light is known. The known image display apparatus uses a primary modulator and an auxiliary modulator to modulate picture elements of an image. In such known image display apparatus, the contrast range of the projected image is able to be extended as a result of the finite minimum image brightness above true black being reduced. GB 2317290 shows how the contrast of images is able to be improved.

Single monochrome primary modulators can be used with colour sequential illumination in order to produce a full colour image. However, this type of colour sequential illumination can produce temporal artifacts which may not be reduced if an auxiliary modulator were to be used.

GB 2396072 describes apparatus in which a first primary modulator for modulating red light, a second primary modulator for modulating green light and a third primary modulator for modulating blue light are optically relayed to an auxiliary modulator which further modulates the light to enhance contrast and increase the dynamic range of the image display apparatus. Also described is a method for controlling the operation of the primary and auxiliary modulators such that the enhancements to contrast and dynamic range can be achieved.

Consideration also needs to be given to the optical means which is used in the image display apparatus and which is for relaying the image from the primary modulator or primary modulators to the auxiliary modulator. If the primary modulator or modulators and the auxiliary modulator are of the same size, then the image must be relayed with a unity magnification. Preferably, the image should be relayed such that each pixel in the primary modulator is imaged onto the equivalent pixel in the auxiliary modulator. Alternatively each pixel in the primary modulator may be imaged onto the equivalent group of pixels in the auxiliary modulator. This applies to both reflective and transmissive light modulators. Refractive systems for relaying the image can be used, and when they are designed, they need to take into account performance in terms of resolution, scatter and colour correction. Compromises have to be made with such systems. In order to reduce scatter and hence a lowering of contrast in the image display apparatus, the number of refractive elements needs to be kept to a minimum, but more lenses are needed to provide sufficient resolution and colour correction, which in turn increases any scatter. Also, refractive systems that provide sufficient resolution and colour correction are longer as a result of the increased number of lenses, and they are consequently more expensive. Reflective optical means may also be used to relay the light from the primary modulator to the auxiliary modulator. Reflective optical means include a curved mirror in combination with refractive optical components. The number of components again depends on the performance required for relaying the image from the primary modulator to the auxiliary modulator, the number of components increasing with increased performance.

If optical relay means, which may be refractive or reflective optical relay means, is designed to give the desired performance then other factors may influence the performance of the image display apparatus. Manufacturing methods and tolerances in certain circumstances are not able to give the desired performance which can be shown in the image display apparatus as a misalignment between modulators or a magnification error for example. Also cost limitations may influence design which in turn reduces performance. As a result, the image may not be relayed from the primary modulator to the auxiliary modulator with the required accuracy, giving rise to undesirable image artifacts in the final projected image such as moiré fringing, defocusing and light point dimming.

It is an aim of the present invention to obviate or reduce the above mentioned problems.

Accordingly, the present invention provides image display apparatus comprising a light source, at least one primary modulator for modulating light, an auxiliary modulator for modulating the light modulated by the primary modulator, optical means for relaying the light modulated by the primary modulator to the auxiliary modulator, control means for controlling the primary modulator and the auxiliary modulator, and projector means for projecting light modulated by the auxiliary modulator, characterized in that:

the primary modulator comprises a first array of pixels, and the auxiliary modulator comprises a second array of pixels;

each pixel in the first array of pixels of the primary modulator is controlled by the control means as a function of video input data for each pixel in the first array of pixels; and each pixel in the second array of pixels of the auxiliary modulator is controlled by the control means as a function of video input data for each pixel in the second array of pixels, and each adjacent pixel in the second array of pixels.

Controlling the auxiliary modulator as a function of each pixel in the second array of pixels and the pixels which are adjacent to the selected pixel, with the primary modulator being controlled as a function of the pixel shows significant improvements over known technology. In particular, there are improvements in local brightness of displayed images, especially in the instances when there are few pixels from the complete pixel array shown to a bright, full-on or near full-on level. In contrast, with known apparatus, any slight misalignment will result in these images showing the bright points or pixels at a reduced brightness. This can have implications in certain applications such as flight simulation. Also misalignment can cause other effects such as colour fringe effects and blurring of the image to occur. This invention also advantageously contributes to the manufacturing process involved in producing the projector means as the accuracy to which alignment has to be achieved is no longer the most critical factor in the process. Moiré fringing is another visible artifact which is reduced significantly.

The image display apparatus may be one in which the primary modulator and the auxiliary modulator are transmissive spatial light modulators. Alternatively, the image display apparatus may be one in which the primary modulator and the auxiliary modulator are reflective spatial light modulators.

The primary modulator and the auxiliary modulator may be the same type of spatial modulator. Alternatively, the primary modulator and the auxiliary modulator may be different types of spatial modulator.

The image display apparatus may comprise a first primary modulator to modulate a first wavelength of light, a second primary modulator to modulate a second wavelength of light, and a third primary modulator to modulate a third wavelength of light.

The image display apparatus may be one in which the primary modulator is, or the primary modulators are, compensated to correct any anomalies in the resultant image introduced by selection means for the auxiliary modulator.

The optical means may be a refractive optical relay. Alternatively, the optical means may be a reflective optical relay.

The pixels in the second array of pixels of the auxiliary modulator may be controlled to be full-on or full-off.

Embodiments of the invention will now be described solely by way of example and with reference to the accompanying drawings, in which.

Figure 1:
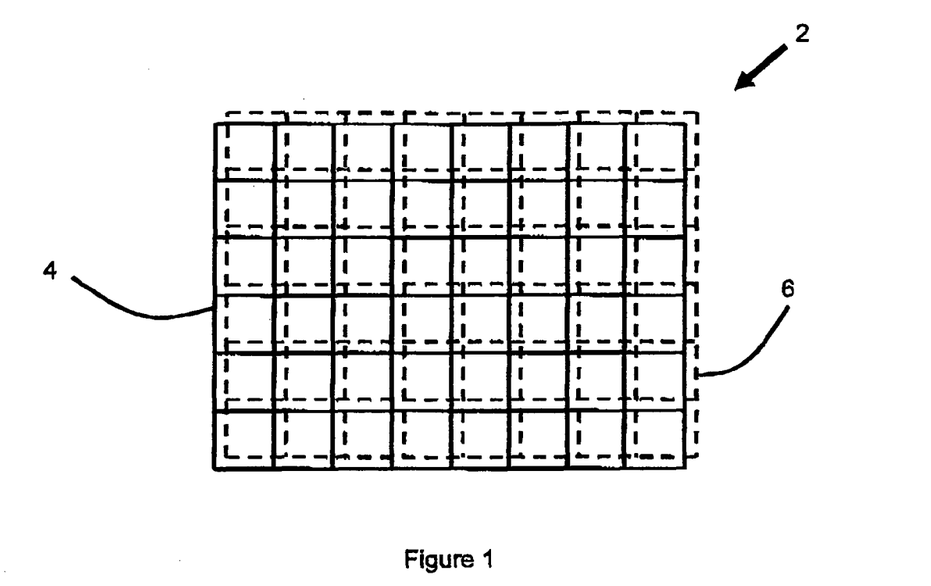
FIG. 1 shows a particular type of misalignment which may occur which causes a lateral convergence error.

FIG. 1 shows schematic output of apparatus 2 having a pixel misalignment which may occur when the image of a primary modulator is optically relayed to the auxiliary modulator. The solid grid 4 shows the pixels of the auxiliary modulator in an array. The dotted lines 6 show the image of the pixel array of the primary modulator which has been optically relayed onto the auxiliary modulator. The error shown is a lateral shift in both "x" and "y" directions. If the convergence of the images were accurate, then the dotted grid 6 would be fully aligned with the solid grid 4.

Figure 2:
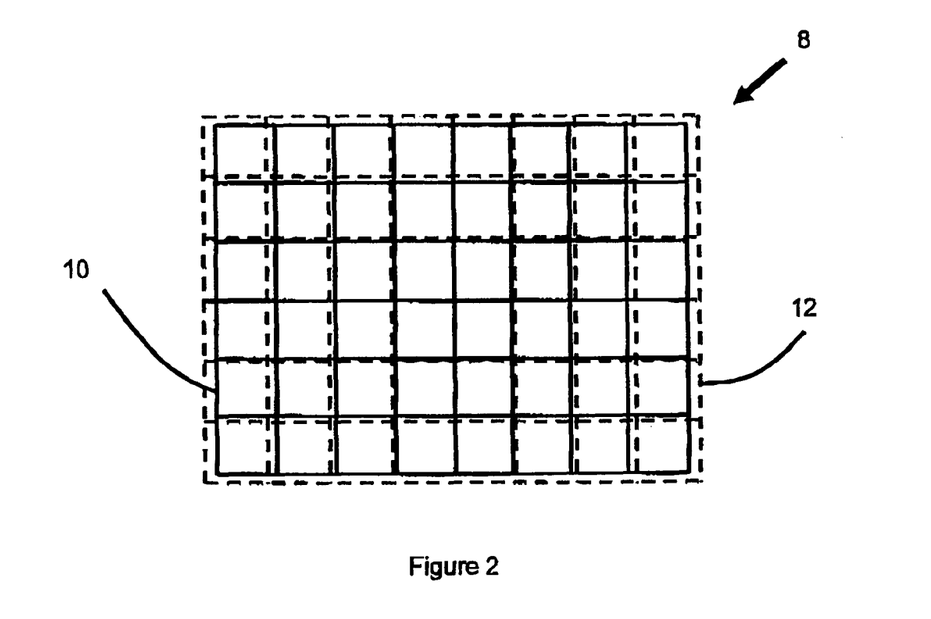
FIG. 2 shows an over magnification type misalignment which causes convergence errors.

FIG. 2 shows schematic output of apparatus 8 having a pixel misalignment which may occur when the image of a primary modulator is optically relayed to the auxiliary modulator. The solid grid 10 shows the pixels of the auxiliary modulator in an array. The dotted lines 12 show the image of the pixel array of the primary modulator which has been optically relayed onto the auxiliary modulator. The error shown is a magnification error. The image of the primary modulator is larger than the auxiliary modulator. If the convergence of the images were accurate, then the dotted grid 12 would be fully aligned with the solid grid 10.

Figure 3:
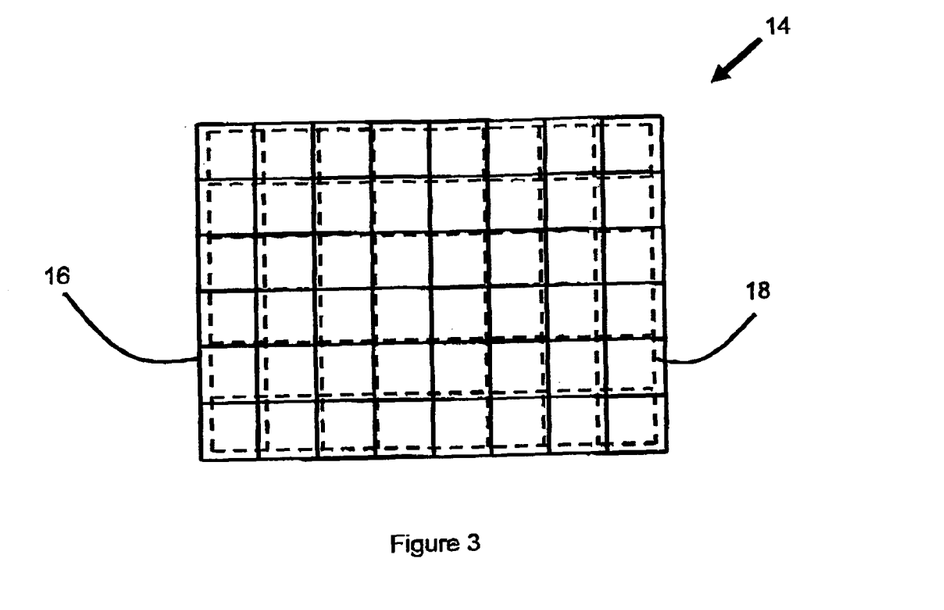
FIG. 3 shows an under magnification type misalignment which causes convergence errors.

FIG. 3 shows schematic output of apparatus 14 having a pixel misalignment which may occur when the image of a primary modulator is optically relayed to the auxiliary modulator The solid grid 16 shows the pixels of the auxiliary modulator in an array. The dotted lines 18 show the image of the pixel array of the primary modulator which has been optically relayed onto the auxiliary modulator. The error shown is a magnification error. The image of the primary modulator in this case is smaller than the auxiliary modulator. If the convergence of the images were accurate, then the dotted grid 18 would be fully aligned with the solid grid 16.

Figure 4:
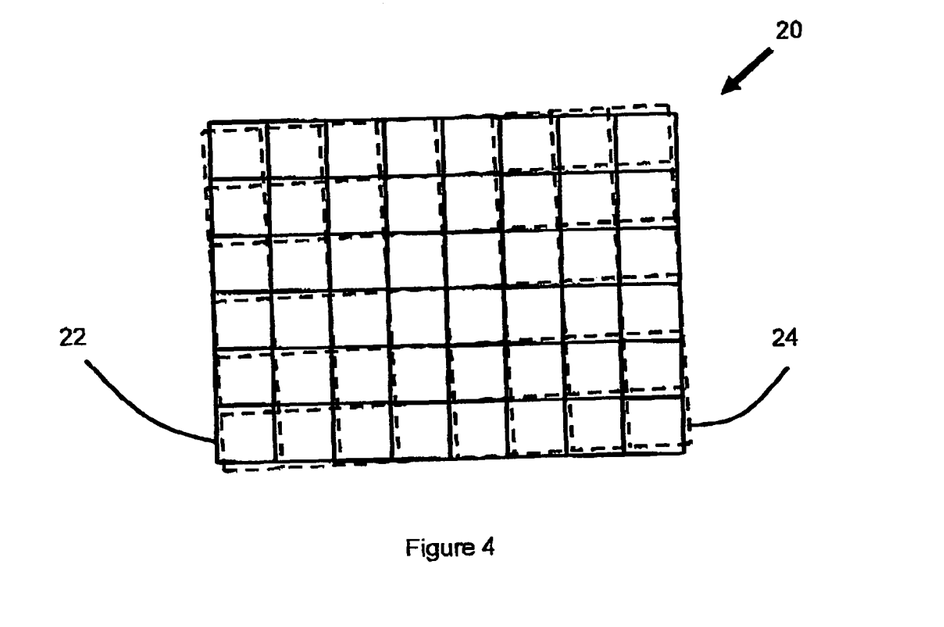
FIG. 4 shows a misalignment caused by a rotational misalignment which causes convergence errors.

FIG. 4 shows schematic output of apparatus 20 having a pixel misalignment which may occur when the image of a primary modulator is optically relayed to the auxiliary modulator. The solid grid 22 shows the pixels of the auxiliary modulator in an array. The dotted lines 24 show the image of the pixel array of the primary modulator which has been optically relayed onto the auxiliary modulator. The error shown is a rotational error. The image of the primary modulator is rotated with respect to the auxiliary modulator. If the convergence of the images were accurate, then the dotted grid 12 would be fully aligned with the solid grid 10.

Figure 5:
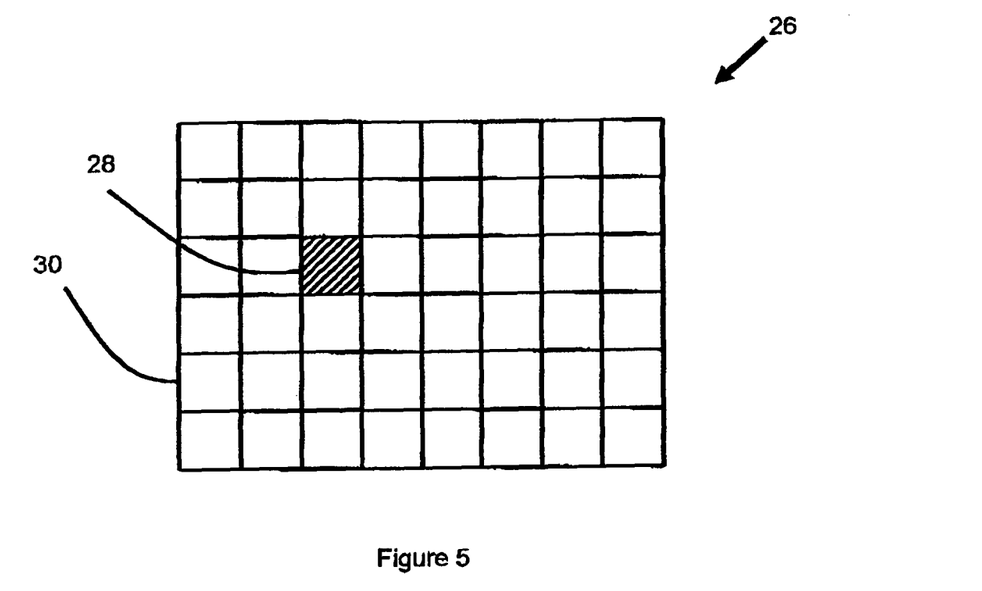
FIG. 5 shows a single pixel with no convergence errors.

FIG. 5 shows schematic output of apparatus 26 in which the image of a single pixel 28 from the primary modulator which is in the "on" state and which has been optically relayed onto the auxiliary modulator, is correctly imaged and aligned with the pixel array 30 of the auxiliary modulator. The shaded area is aligned with the grid such that there is no overlap of the shaded area onto any of the adjacent pixels.

Figure 6:
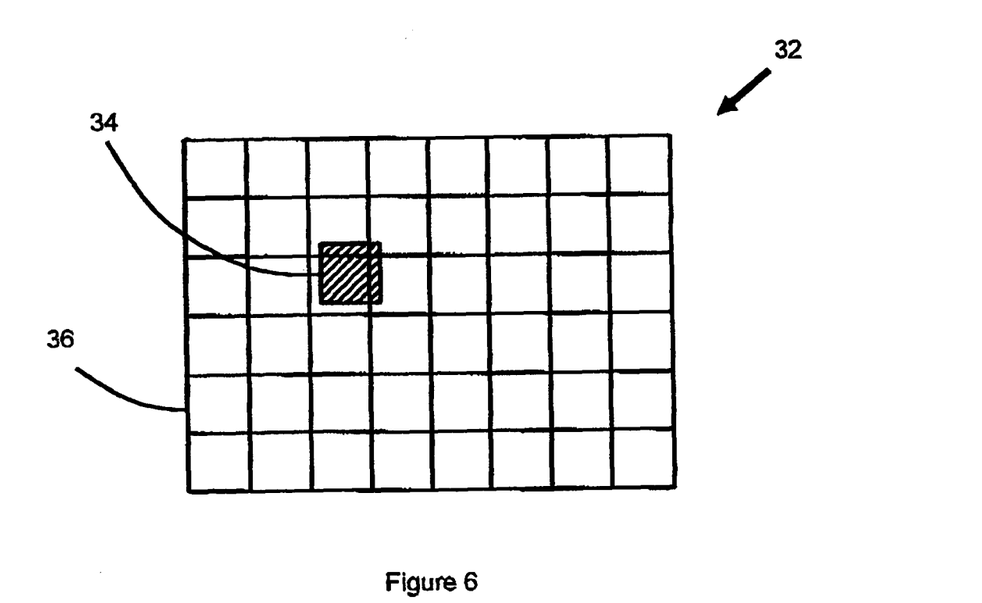
FIG. 6 shows a single pixel with a lateral convergence error.

FIG. 6 shows schematic output of apparatus 32 in which the image of a single pixel 34 from the primary modulator which is in the "on" state and which has been optically relayed onto the auxiliary modulator, is not correctly aligned with the pixel array 36 of the auxiliary modulator. Although a proportion of the shaded area is aligned with the equivalent pixel of the auxiliary modulator, there are areas which are overlapping adjacent pixels.

Figure 7:
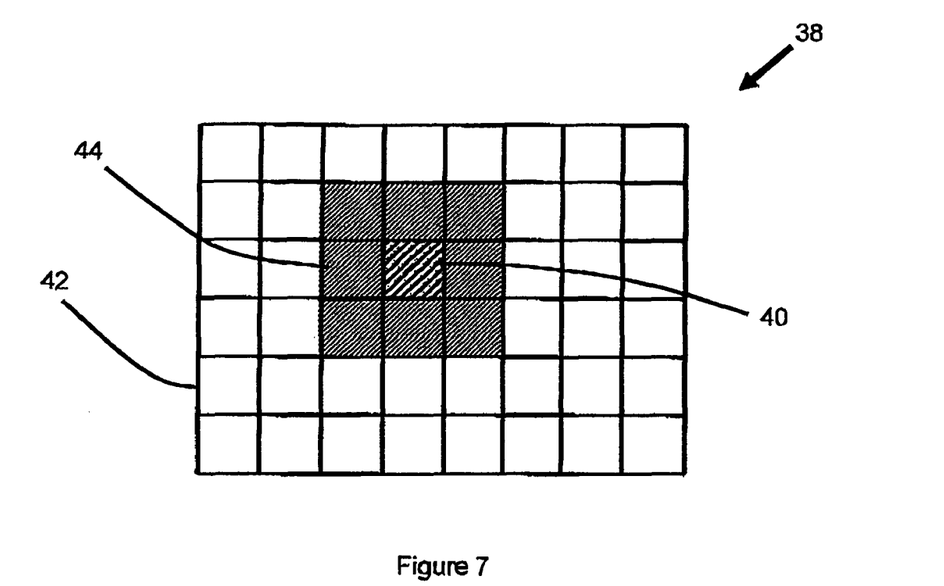
FIG. 7 shows a single pixel with adjacent pixels.

FIG. 7 shows schematic output of apparatus 38 in which a correctly aligned image of a pixel 40 optically relayed from the primary modulator is such that the edges of this pixel image are aligned with the pixel array of the auxiliary modulator 42. FIG. 7 shows the position of a single selected pixel of the primary modulator when imaged onto the auxiliary modulator. The correct alignment means that the image of the single pixel completely covers the equivalent pixel on the auxiliary modulator. The shaded area 44 indicates the pixels on the auxiliary modulator which are directly adjacent to the pixel in the auxiliary modulator which is equivalent to the single pixel 40 of the primary modulator indicated.

Figure 8:
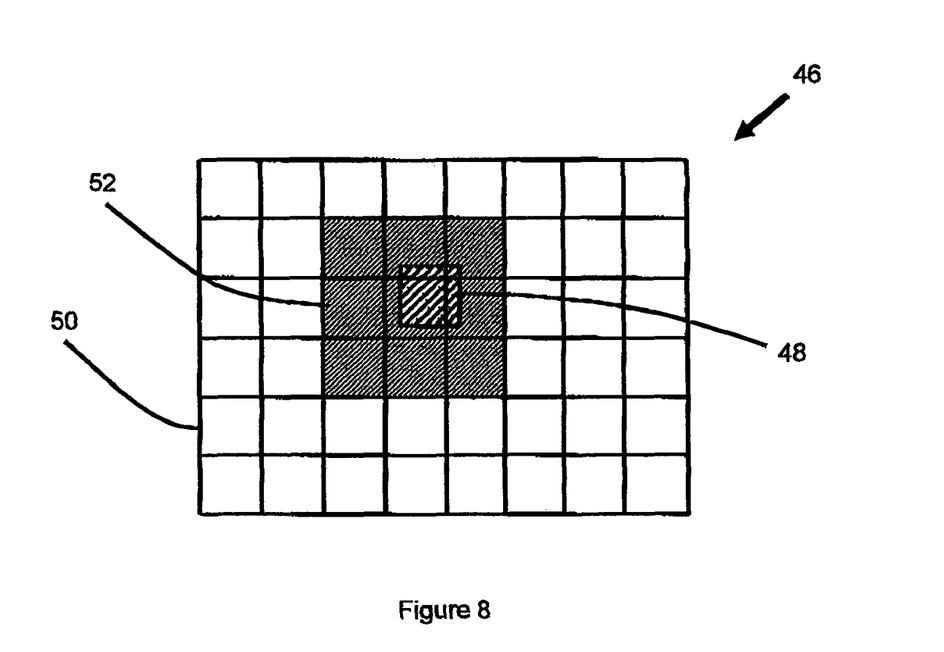
FIG. 8 shows a single pixel having a lateral convergence error with adjacent pixels.

FIG. 8 shows schematic output of apparatus 46 in which the image of a single pixel 48 imaged from the primary modulator onto the auxiliary modulator pixel array 50 has been imaged with a lateral misalignment in both "x" and "y" directions. It can be seen that the single pixel 48 does not align with the equivalent pixel in the auxiliary modulator but overlaps other pixels. The equivalent pixel of the auxiliary modulator and closest adjacent pixels are indicted by the shaded area 52. It can be seen that the single pixel 48 is fully overlapped by the shaded area 52. This would be the case if the misalignment of the image of the primary modulator when optically relayed onto the auxiliary modulator was a maximum of one pixel dimension in either the "x" or "y" direction.

Figure 9:
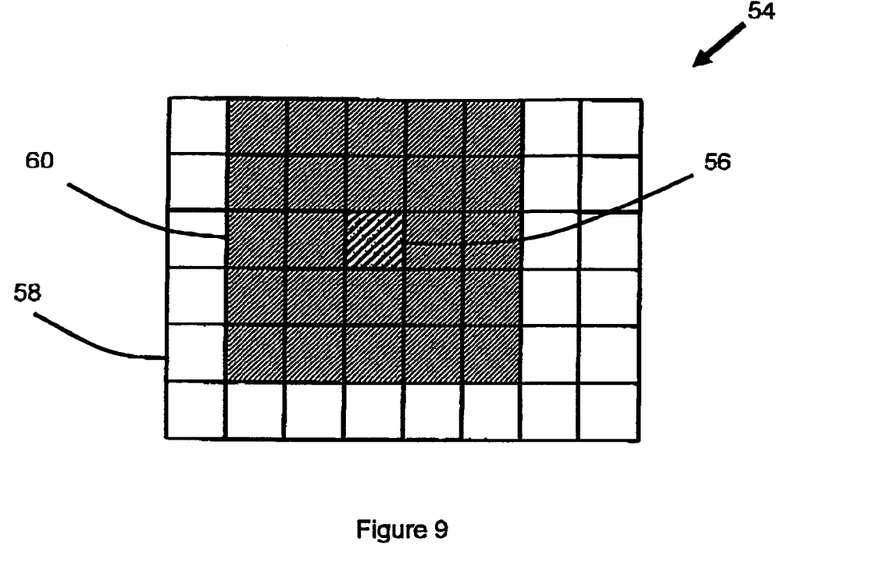
FIG. 9 shows a single pixel with first and second adjacent pixels.

FIG. 9 shows schematic output of apparatus 54 in which a correctly aligned image of a pixel 56 optically relayed from the primary modulator is such that the edges of this pixel image are aligned with the pixel array of the auxiliary modulator 58. FIG. 9 shows the position of a single selected pixel of the primary modulator when imaged onto the auxiliary modulator. The correct alignment means that the image of the single pixel completely covers the equivalent pixel on the auxiliary modulator. The shaded area 60 indicates the pixels on the auxiliary modulator which are the closest adjacent and the next closest adjacent pixels to the pixel in the auxiliary modulator which is equivalent to the single pixel 56 of the primary modulator imaged onto the auxiliary modulator. In this case a misalignment of two pixels in either direction would still mean that the image of the single pixel 56 is overlapping with the shaded area 60. It is clear that larger areas on the auxiliary modulator may be chosen to ensure that there is a guaranteed overlap. The adjacent pixels chosen may be extended to include any number of adjacent pixels in a particular direction.

Figure 10:
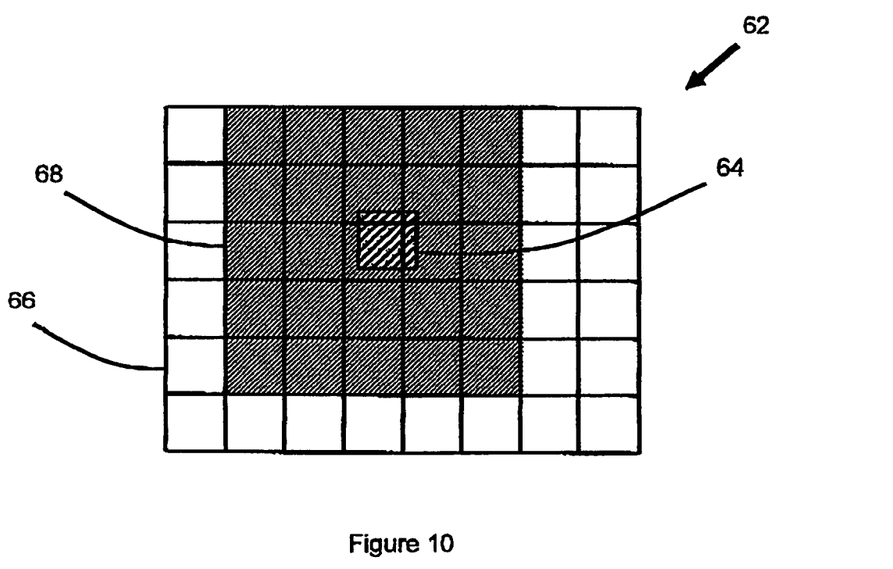
FIG. 10 shows a single pixel having a lateral convergence error with first and second adjacent pixels.

FIG. 10 shows schematic output of apparatus 62 in which the image of a single pixel 64 imaged from the primary modulator onto the auxiliary modulator pixel array 66 has been imaged with a lateral misalignment in both "x" and "y" directions. It can be seen that the image of the single pixel 64 does not align with the equivalent pixel in the auxiliary modulator but overlaps other pixels. This overlap is covered fully by the closest and next closest adjacent pixels shown by the shaded area 68. This would be the case if the misalignment between the primary modulator and the auxiliary modulator was a maximum of two pixel dimensions in either the 'x' or 'y' directions.

If the misalignment is greater than two pixel dimensions then further next closest adjacent pixels can be added to the window or shaded area on the auxiliary modulator to guarantee complete overlap with the single pixel imaged from the primary modulator onto the auxiliary modulator.

Figure 11:
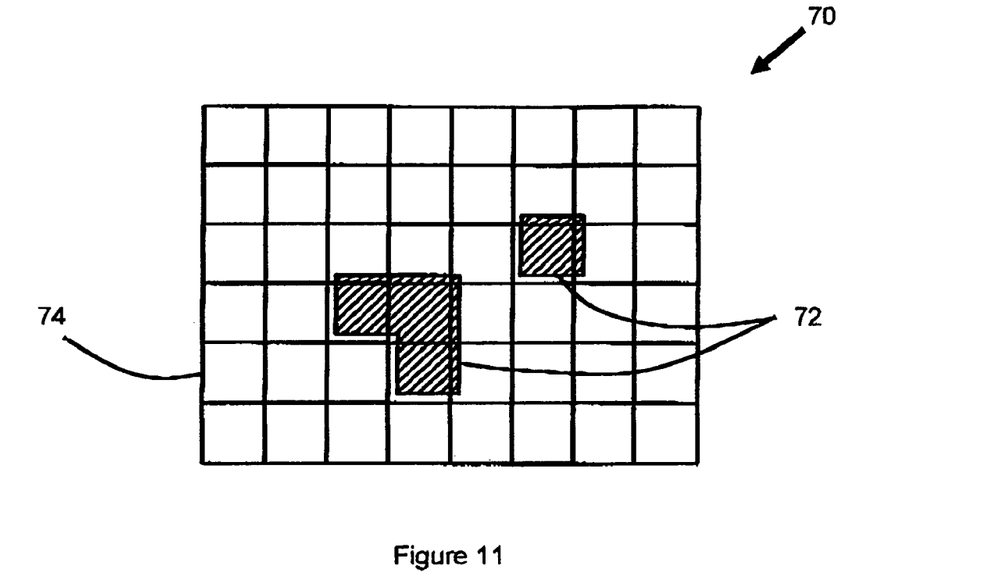
FIG. 11 shows a plurality of pixels each having a convergence error.

FIG. 11 shows schematic output of apparatus 70 in which pixels imaged from the primary modulator on to the auxiliary modulator are indicated by shaded areas 72. The image of the pixels optically relayed from the primary modulator onto the auxiliary modulator do not align with the equivalent pixels on the auxiliary modulator array 74. A lateral misalignment is shown in both the "x" and "y" directions.

Figure 12:
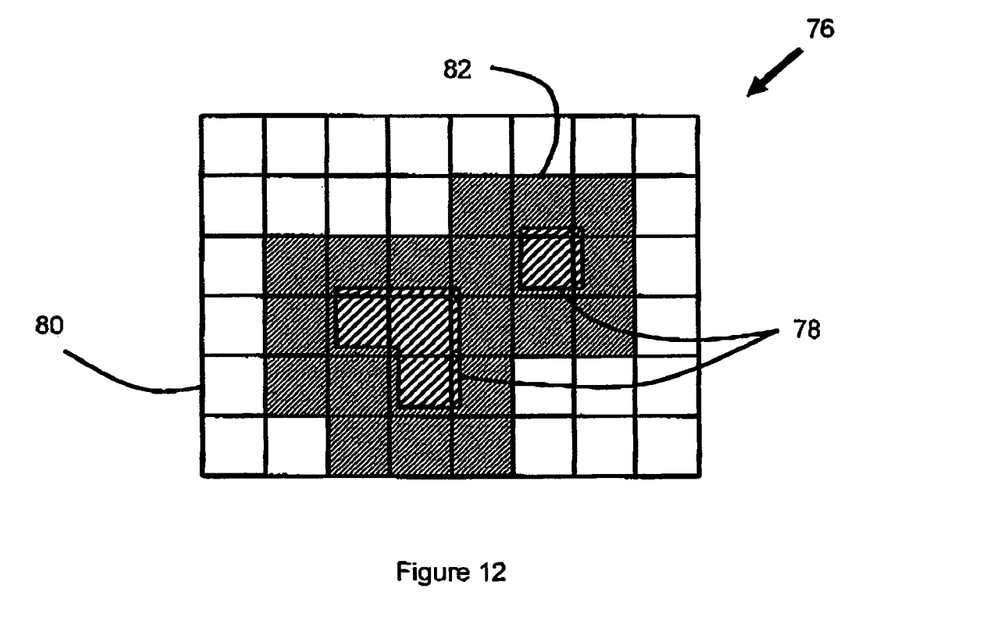
FIG. 12 shows a plurality of pixels each having a convergence error and the adjacent pixels.

FIG. 12 shows schematic output of apparatus 76 in which pixels 78 imaged from the primary modulator on to the auxiliary modulator are indicated by the heavy shaded areas. The equivalent pixels in the pixel array 80 of the auxiliary modulator and the closest adjacent pixels are indicated by shaded area 82. It can be seen that in this example the closest adjacent pixels shown form a one pixel boundary around the selected pixels allowing a one pixel misalignment in the "x" or "y" directions and to still have full overlap of the selected pixels on the primary modulator when imaged on to the auxiliary modulator.

Figure 13:
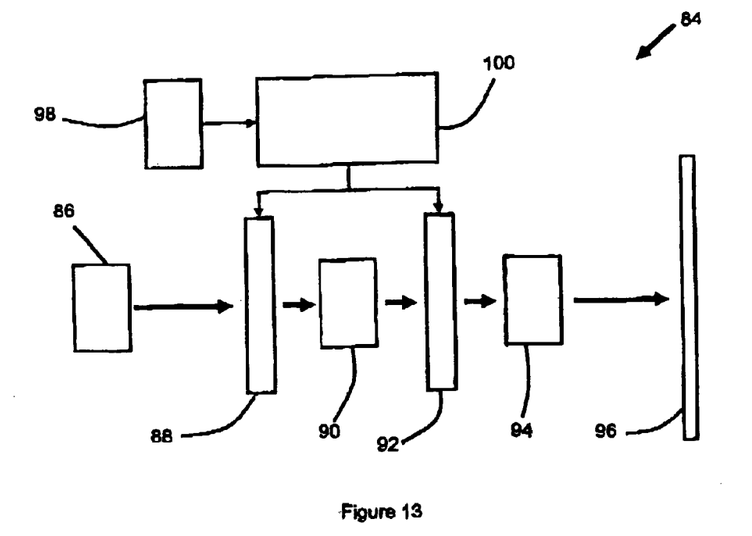
FIG. 13 shows schematically known apparatus having more than one modulator for modulating light.

FIG. 13 shows known apparatus 84 in which a light source 86 illuminates a primary modulator 88 which modulates light, which modulated light is relayed to an auxiliary modulator 92 via relay optics 90 where the light undergoes further modulation before being projected by projection lens 94 onto a screen 96. The screen may be a front or rear projection screen. Video image data is supplied from video input 98 to controller 100. Controller 100 controls the primary modulator 88 and the auxiliary modulator 92 such that each pixel in the primary modulator 88 is controlled as a function of the video input data 98 to that pixel and the equivalent pixel in the auxiliary modulator is also controlled as a function of the video input data 98 to that pixel only.

A consequence of this arrangement is that the light modulated by the primary modulator must be very accurately relayed optically to the auxiliary modulator to ensure that the image of each pixel of the primary modulator when optically relayed onto the auxiliary modulator is overlapped precisely with the equivalent pixel of the auxiliary modulator. As the resolution of the micro-displays used in such applications has increased, the pixel size has reduced and consequently alignment has become more demanding. This is the case for all types of micro-displays including liquid crystal and digital micro-mirror device type displays. The same would be true for any micro-display with small, approximately less than 25 microns pixel dimensions. Pixel dimensions are now regularly less than 8 microns.

Figure 14:
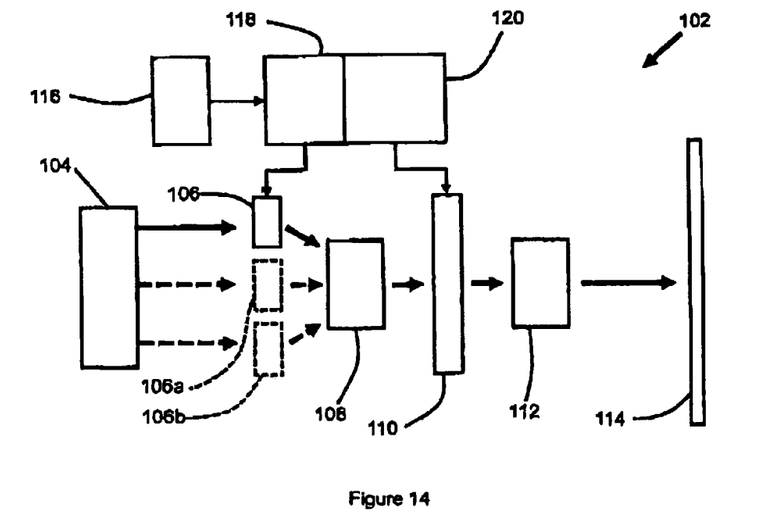
FIG. 14 shows schematically apparatus of the present invention for modulating light having one or more modulators for modulating light.

FIG. 14 shows apparatus 102 which is an embodiment of the invention. Light source 104 illuminates primary modulator 106. Primary modulator 106 may be a transmissive or reflective spatial light modulator or any of the known spatial light modulators such as liquid crystal or digital micro-mirror devices. Primary modulator 106 is shown as a transmissive modulator. Light modulated by primary modulator 106 is relayed to auxiliary modulator 110 via relay optics 108. Light which has been modulated by the auxiliary modulator is then projected to the screen 114 via projection lens 112. The screen 114 may be a front or rear projection screen and may be flat or curved. Video input data 116 is input to the controller means 118 which controls the primary modulator 106. The primary modulator 106 is controlled as a function of the video data input. This function may be a multiplication function of the video data input. This multiplication factor may be one, more than one or less than one. The multiplication may also be an inverse function of the video data input. The auxiliary modulator 110 is controlled by controller 120. Controller 120 receives video image data from the controller 118 which supplies information regarding the control of the primary modulator 106. The controller 120 controls the auxiliary modulator 110 as function of the image data sent to each pixel in the primary modulator and also the image data sent to each pixel adjacent to that pixel. The adjacent pixels may include the closest adjacent pixels, which are those pixels directly alongside the pixel to which the function is being applied or may include next adjacent pixels which can include several pixels in all directions. This is shown in FIGS. 7 and 9 and can obviously be extended beyond the extent shown. The controllers 118 and 120 form control means for controlling the primary modulator 106 and the auxiliary modulator 110.

The simplest example which can be identified for this embodiment is if the primary modulator is driven with a function which is a unity multiplication function with the equivalent pixel and adjacent pixels of the auxiliary modulator being driven to a fully on level. As mentioned, the primary modulator and/or the auxiliary modulator may be a digital light modulator such as a digital micro-mirror device or any other digital light modulator. Digital micro-mirror devices use temporal switching techniques to modulate light and generate greyscales. In image display apparatus in which the primary modulator and the auxiliary modulator are both digital micro-mirror devices, it would usually be required to synchronise the timing of equivalent pixels or groups of pixels. This example described above overcomes problems which may arise when the primary modulator is a digital micro-mirror device and the auxiliary modulator is also a digital micro-mirror device as the timing of both modulators is not required to be precisely aligned. The precise alignment would be needed as the digital modulators act as 'gates' for the light and require both 'gates' to be open at the same time for light to pass.

Although the accompanying diagrams and text show the primary modulator receiving light from the light source, it is also possible that the locations of the auxiliary and primary modulators in the image display apparatus could be reversed such that the auxiliary modulator receives light from the light source. The functions applied to the modulators by the control means would be the same.

If a single pixel has a misalignment which means that only 50% of the area of the pixel overlaps the corresponding pixel of the auxiliary modulator, then the control scheme disclosed will significantly increase the light transmitted to the screen for viewing. FIG. 14 shows monochrome image display apparatus using one primary modulator and an auxiliary modulator. This arrangement is also suitable for a colour projector, if a colour wheel is inserted in the light path or a colour sequential light source is used.

Figure 15:
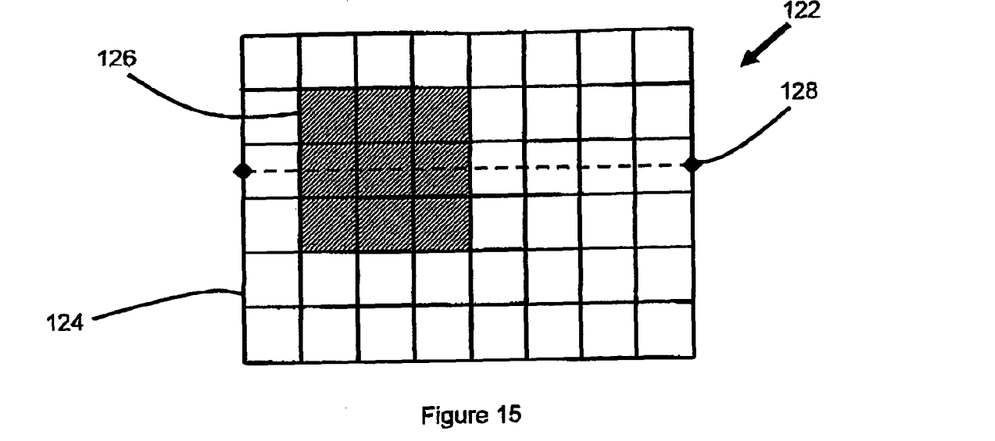
FIG. 15 shows the auxiliary modulator and shows which pixels are being controlled.

FIG. 15 shows apparatus 122 which includes the pixel array 124 of the auxiliary modulator. The shaded area 126 indicates nine pixels of the auxiliary modulator. The centre pixel of the area is the pixel which is equivalent to the pixel of the primary modulator from which the video image data is taken.

The other eight pixels indicate the closest adjacent pixels to the reference pixel. The controller drives these nine pixels as a function of the video image data. Broken line 128 shows a section across the modulator from which pixel intensities can be shown.

Figure 16:
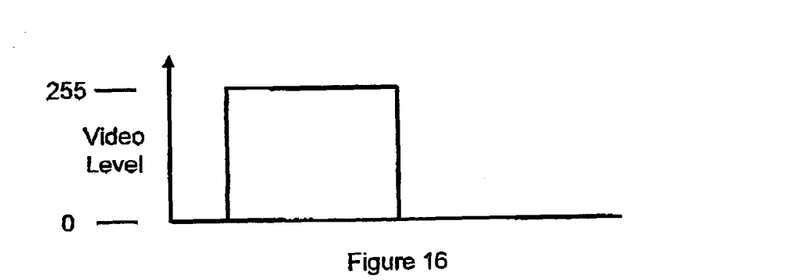
FIG. 16 shows the pixel intensity of the auxiliary modulator.
Figure 17:
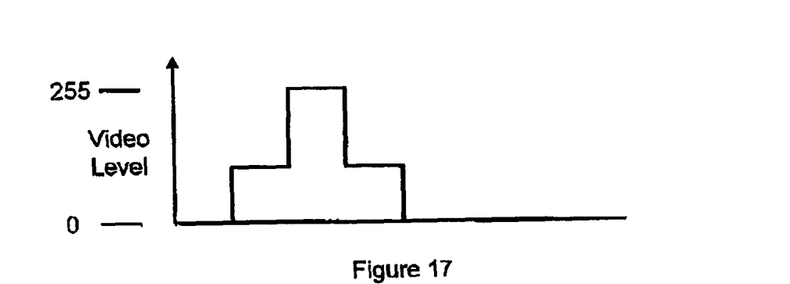
FIG. 17 shows alternative pixel intensities.
Figure 18:
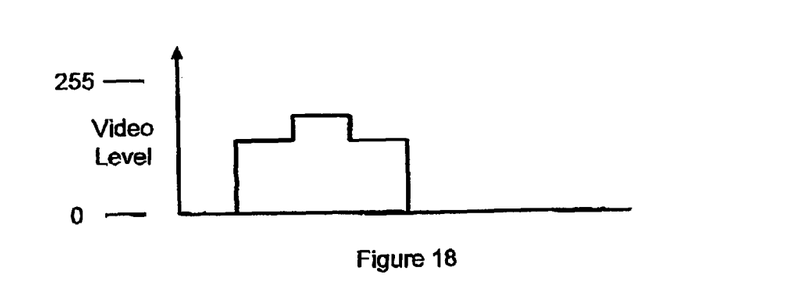
FIG. 18 also shows alternative pixel intensities.

FIGS. 16, 17 and 18 show the intensity of pixels across the auxiliary modulator indicated by the broken line.

FIG. 16 shows all pixels driven to the full drive level 255, in an 8 bit apparatus. This control function to the auxiliary drives the reference pixel and the closest adjacent pixels to the maximum level, which is fully on. The reference pixel is the pixel in the auxiliary modulator which is equivalent to the pixel in the primary modulator from which the video image data is taken.

FIG. 17 shows an alternative control function in which the reference pixel, the pixel equivalent to the pixel in the primary modulator, is driven at full drive level 255, in 8 bit apparatus for example and the eight adjacent pixels are driven at a level which is less than the maximum drive level. This shows a "top hat" type profile with the centre at maximum drive.

FIG. 18 shows another control function in which the reference pixel is driven at a level which is less than the maximum level and the adjacent pixels are driven at a still lower level. This is again a "top hat" type profile but has a peak centre value less than the maximum 255 value.

Other functions may be used to control the reference pixel and the adjacent pixels. It can also be seen that each of the adjacent pixels is itself a reference pixel and this will have to be taken into account when a full image is displayed and the control functions calculated for the auxiliary modulator. The control function will be the product of the function when applied to all pixels which have an influence on any pixel of the auxiliary modulator, namely the reference pixel and the adjacent pixels.

Figure 19:
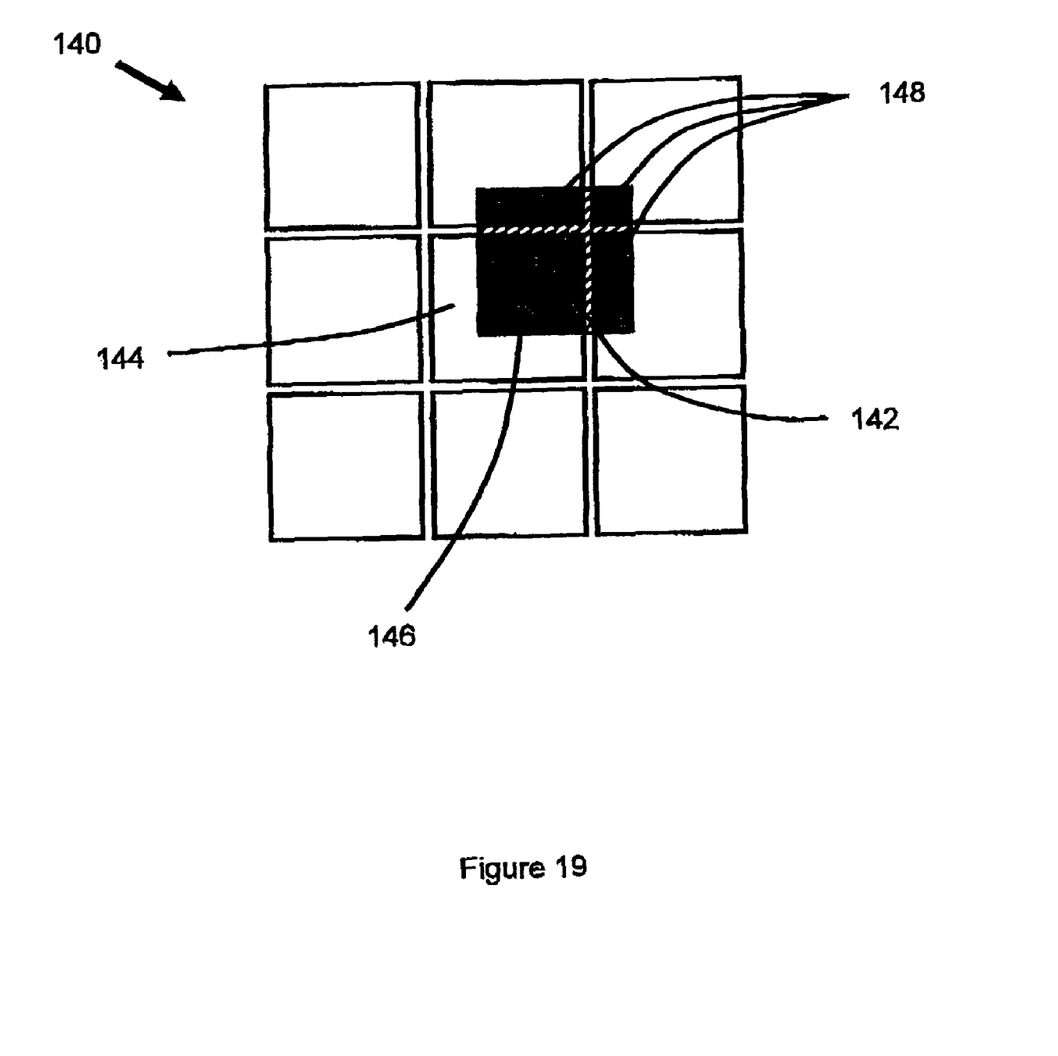
FIG. 19 shows a detail view of a pixel which has a convergence error.

FIG. 19 shows a magnified view 140 of a three by three array of pixels on the auxiliary modulator and the image of a single pixel of the primary modulator when imaged on to the auxiliary modulator. There is a lateral misalignment of the pixel. Correct alignment would show the shaded pixel aligned with the centre pixel of the three by three array. The centre pixel 144 of the auxiliary three by three array shown is controlled as a function of the corresponding pixel in the primary modulator, in this case the shaded pixel and the adjacent eight pixels. In this example these eight adjacent pixels have zero video level applied to them in the primary modulator. It can be seen that the only portion of the shaded pixel which overlaps the centre pixel 144 is the area 146 indicated. The areas 148 each overlap adjacent pixels. If the control function which was described above is used in which the adjacent pixels are driven to a full video 255 level then this will result in a greater portion of the light from the primary modulator reaching the screen. As can be seen not all the light will be passed to the screen as there is a small area between pixels in spatial light modulators which does not modulate light. This is typically about 10% of the total area of the modulator but can be more or less than 10%. This control method will result in greater light throughput in many images and also remove some artifacts caused by misalignment and misconvergence. The black levels shown in the display will be maintained at a much reduced level, consequently maintaining the improved contrast of such a display.

More complex control can be used to also improve dynamic range whilst also overcoming the artifacts caused by misalignment of the image from the primary modulator on to the auxiliary modulator.

Figure 20:
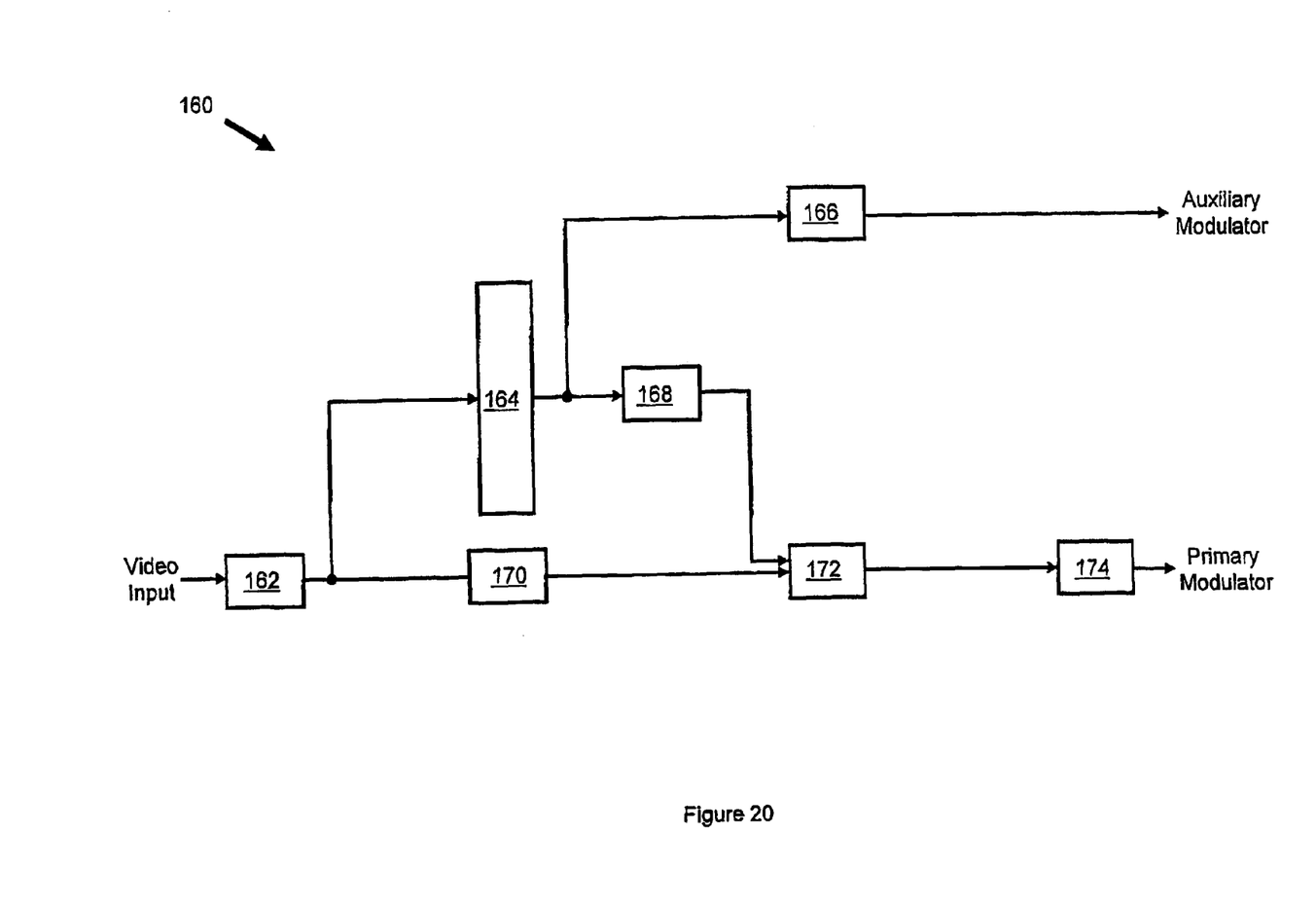
FIG. 20 shows schematically apparatus of the present invention and shows the control of primary and auxiliary modulators with one primary modulator.

FIG. 20 shows schematically apparatus 160 of the present invention and which has a primary modulator and an auxiliary modulator. There is shown in detail control means which controls the primary modulator and auxiliary modulator. Additional means may be included to correct for any colour shift, gamma correction needing to be applied to the displayed image or timing delays which may be required.

Video image data which in this embodiment is either monochrome video data or colour image data using known colour sequential techniques is input to look up table (LUT) 162 which may be used to apply gamma correction to the video data input. Corrected video image data is output to filter control means 164 and time delay means 170. Filter control means 164 applies a function to the video image data which is a function of the video image data to each pixel and to each adjacent pixel. Filter control means 164 uses framestore means 176 to access and obtain pixel data for the adjacent pixels. If the closest adjacent pixels are considered then the function is a function of the video input to each pixel and the video input to the adjacent eight pixels. Filter control 164 determines the output to the auxiliary modulator which is output via a time delay means 166 which enables correct synchronization of the primary and auxiliary modulators. As the filter control 164 applies a function to each pixel dependent on the pixel and the adjacent pixels it can be seen that a slight delay is introduced which depends on the number of adjacent pixels taken into account. The output to a particular pixel has to wait until at least the next line of video information is received by the filter control means, as each of the adjacent pixels taken into consideration each in turn depend on the adjacent pixels. Time delay means 170 is used to delay the video image data to the control for the auxiliary modulator 172. The delayed video image data from the time delay means 170 is combined the pixel output image data for each pixel from 168 to determine the drive level for each pixel in the primary modulator. LUTs 174 and 178 may be used for any gamma correction needed.

Previous embodiments have included only one primary modulator and an auxiliary modulator. The image display apparatus may also include more than one primary modulator for modulating light from a light source. In a modification of the image display apparatus 102 shown in FIG. 14, the modulator 106 may be a first primary modulator which modulates red light, and in which case there may be a second primary modulator 106a which modulates green light, and a third primary modulator 106b which modulates blue light. The modulated red, green and blue light is combined optically and is then modulated by the auxiliary modulator. There are many known methods in which white light is split into separate colours, undergoes modulation and is then recombined to produce a coloured image. In this invention, the recombined light is relayed to an auxiliary modulator where it undergoes further modulation. The one or more primary modulators may be reflective or transmissive spatial light modulators. The auxiliary modulator may also be a reflective or a transmissive spatial light modulator. The one or more primary modulators and the auxiliary modulator may be the same type of spatial light modulator or may be different types of spatial light modulator.

In known image display apparatus which has a red primary modulator, a green primary modulator and a blue primary modulator and an auxiliary modulator, there are known methods by which the individual modulators are controlled in order to project a satisfactory image on to the screen. However these known methods do not include the invention as disclosed in which the primary modulators are controlled as a function of the video input data for each pixel and the auxiliary modulator is controlled as a function of the video input data for each pixel and each adjacent pixel.

Figure 21:
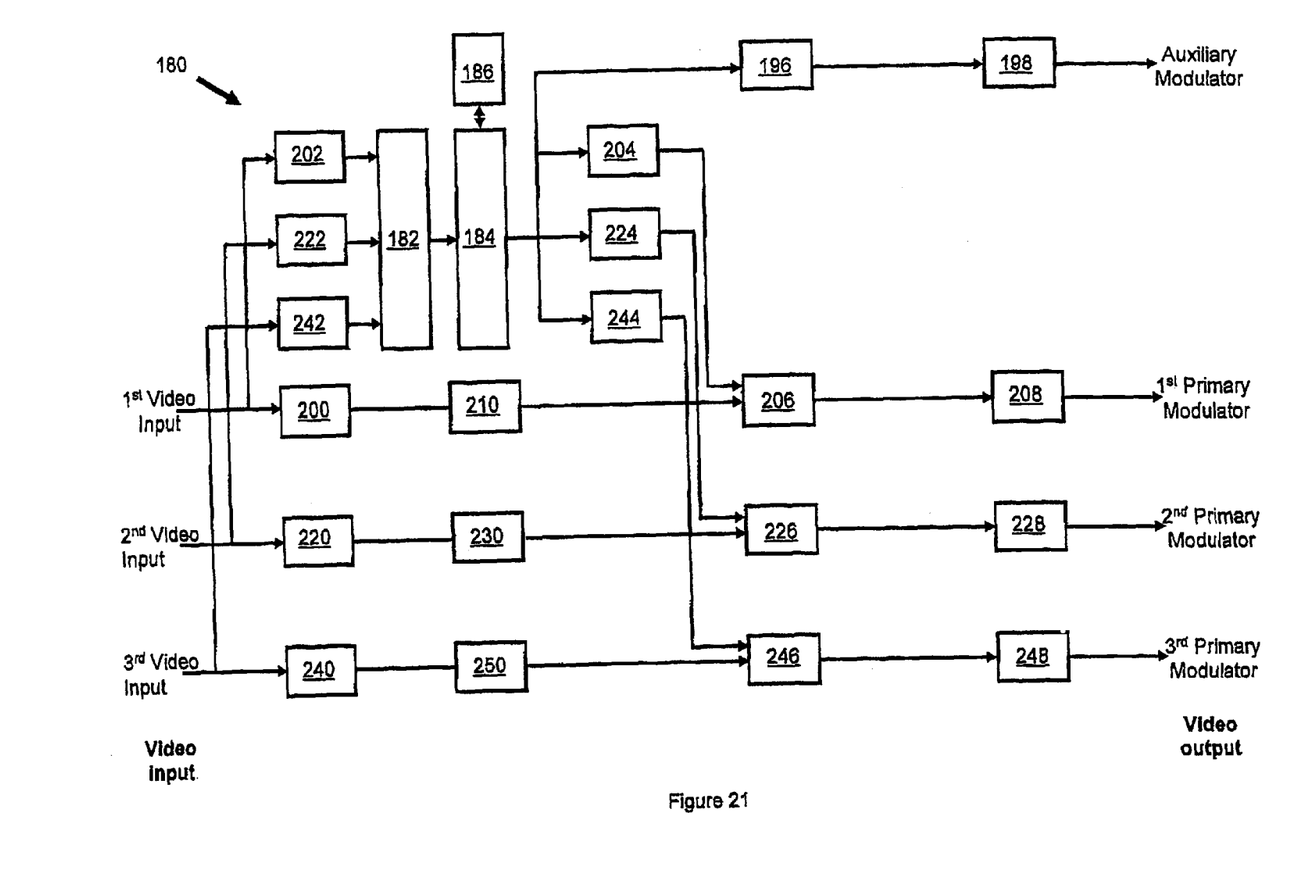
FIG. 21 shows schematically apparatus of the present invention and shows the control of primary and auxiliary modulators with more than one primary modulator.

FIG. 21 shows schematically apparatus 180 in which there is a plurality of primary modulators and an auxiliary modulator. Look up tables (LUTs) are used to perform signal manipulation and mathematical functions on the video data inputs. Alternative means could be used such as functions implemented in digital logic devices but LUTs are preferred for their flexibility in this embodiment.

The schematic diagram shows first, second and third video inputs which are typically red, green and blue video inputs. Other inputs are known such as cyan, yellow and magenta and also more than three video inputs and corresponding primary modulators could be used. A plurality of video inputs is used to form a final colour image which is projected on to the screen. Other video inputs such as an infrared video data input channel are also known.

First video data inputs to LUT 200 which may be used to adjust any gamma present in the video signal. First video data is also input to LUT 202 which also adjusts any gamma present in the video signal. Using separate LUTs enables flexibility in the design allowing different functions to be applied in LUT 200 and LUT 202 if desired. The same function may also be applied to each of the LUTs 200 and 202. LUTs 220 and 222 perform likewise for the second video data input with LUTs 240 and 242 repeating this for the third video data input. LUTs 202, 222 and 242 may also be used to apply a correction function to the first, second and third video data inputs. Selection means 182 is used to select the dominant signal from the first, second and third video data inputs. The dominant signal is normally the signal with the highest numerical input demand, but alternative schemes may be used which use other criteria such as visual sensitivity or colour preference to determine the dominant signal. The dominant signal is used to determine the drive signal to the auxiliary modulator. Control means 184 outputs control data to the auxiliary modulator as a function of each pixel and the adjacent pixels. Control means 184 uses linestore means 186 to access and obtain pixel data for the adjacent pixels. Time delay means 196 is located between control means 184 and the auxiliary modulator. A LUT 198 is also located before the auxiliary modulator. This LUT may be used to apply gamma correction to the output to the auxiliary modulator if required.

Control means 184 also outputs to LUTs 204, 224 and 244. These LUTs determine the compensation which has to be applied to each of the primary modulators to compensate for any functions which have been applied by the control means 184 to the auxiliary modulator.

The amount of light transmitted through to the projection screen is dependent on both the primary modulators and the auxiliary modulator. The effect of the modulators on the transmitted light is a multiplicative effect. Therefore as the auxiliary modulator is driven as a function of the dominant signal to the first, second and third primary modulators then some compensation is needed to maintain the correct characteristics in terms of brightness and colour for example of the displayed image and to correct for any anomalies which may have been introduced. This is achieved by the use of further LUTs located in the output from the control means 184 to the primary modulators.

LUTs 204, 222 and 244 are used to compensate the drive signal to the first, second and third primary modulators respectively. The LUT applies an inverse function to the drive function output from the control means 184. LUT 204 applies an inverse function to the drive signal which is fed to multiplier means 206. The video input data having undergone any gamma correction needed by LUT 200 is also fed via time delay means 210 to the multiplier means 206. The time delay means is needed to compensate for possible delays caused by the control means 184 having to access data from the linestore means 186. Multiplier means 206 outputs to a further LUT 208. This LUT 208 is also used for gamma correction to the video data output if needed. The multiplier means effectively compensates for any variation in video drive signal which may be introduced by the selection means 182 and control means 184 by applying an inverse function, which is the inverse of the function which is applied to the drive to the auxiliary modulator, to the video drive signal to the primary modulators.

The control means also outputs to LUT 224 which applies an inverse function to the drive signal which is in turn input to multiplier means 226. Second video data input to the apparatus undergoes any gamma correction needed at LUT 220 and has time delay applied by time delay means 230 if needed, again to compensate for any delay introduced by the control means accessing linestore 186. Multiplier means 226 is used to multiply this video data input by the output from LUT 224 which again compensates for any variation introduced by selection means 182 and control means 184.

The control means also outputs to LUT 244 which applies an inverse function to the drive signal which is in turn input to the multiplier means 246. Third video data input to the apparatus undergoes any gamma correction needed at LUT 240 and has time delay applied by time delay means 250 if needed, again to compensate for any delay introduced by the control means accessing linestore 186. Multiplier means 246 is used to multiply this video data input by the output from LUT 244 which again compensates for any variation introduced by selection means 182 and control means 184.

The embodiment shows that in projector means which has more than one primary modulator, in this case first, second and third primary modulators, the method by which the primary modulators are controlled as a function of the video input to each pixel and the auxiliary modulator is controlled as a function of the video input to each pixel and each adjacent pixel is still able to provide a satisfactory image as compensation means can be included to correct any anomalies introduced by the selection means 186 which selects the dominant signal to the primary modulator.

It is to be appreciated that the embodiments of the invention described above with reference to the accompanying drawings have been given by way of example only and that modifications may be effected.

The invention claimed is:

1. Image display apparatus comprising projector means, a light source, at least one primary modulator for modulating light, an auxiliary modulator for modulating the light modulated by the primary modulator, optical means for relaying the light modulated by the primary modulator to the auxiliary modulator, control means for controlling the primary modulator and the auxiliary modulator, and projector means for projecting light modulated by the auxiliary modulator, characterized in that:

the primary modulator comprises a first array of pixels, and the auxiliary modulator comprises a second array of pixels;

each pixel in the first array of pixels of the primary modulator is controlled by the control means as a function of video input data for each pixel in the first array of pixels; and each pixel in the second array of pixels of the auxiliary modulator is controlled by the control means as a function of video input data for each equivalent pixel in the second array of pixels, and each adjacent pixel in the second array of pixels.

2. Image display apparatus according to claim 1 in which the primary modulator and the auxiliary modulator are transmissive spatial light modulators.

3. Image display apparatus according to claim 1 in which the primary modulator and the auxiliary modulator are reflective spatial light modulators.

4. Image display apparatus according to claim 1 in which the primary modulator and the auxiliary modulator are the same type of spatial modulator.

5. Image display apparatus according to claim 1 in which the primary modulator and the auxiliary modulator are different types of spatial modulator.

6. Image display apparatus according to claim 1 and comprising a first primary modulator to modulate a first wavelength of light, a second primary modulator to modulate a second wavelength of light, and a third primary modulator to modulate a third wavelength of light.

7. Image display apparatus according to claim 1 in which the primary modulator is, or the primary modulators are, compensated to correct any anomalies in the resultant image introduced by selection means for the auxiliary modulator.

8. Image display apparatus according to claim 1 in which the optical means is a refractive optical relay.

9. Image display apparatus according to claim 1 in which the optical means is a reflective optical relay.

10. Image display apparatus according to claim 1 in which the pixels in the second array of pixels of the auxiliary modulator are controlled to be either full-on or full-off.

* * * * *